United States Patent [19]
Citta

[11] Patent Number: 4,528,663
[45] Date of Patent: Jul. 9, 1985

[54] PEAK LOAD ACCESS IN A TWO-WAY CATV CONTENTION SYSTEM

[75] Inventor: Richard W. Citta, Oak Park, Ill.

[73] Assignee: Zenith Electronics Corporation, Glenview, Ill.

[21] Appl. No.: 560,087

[22] Filed: Dec. 9, 1983

[51] Int. Cl.³ .......................... H04J 3/00; H04H 1/00
[52] U.S. Cl. ................................. 370/94; 340/825.54; 455/5
[58] Field of Search ............... 370/85, 94; 340/825.54; 455/5

[56] References Cited

U.S. PATENT DOCUMENTS

| | | | |
|---|---|---|---|
| 3,587,044 | 6/1971 | Jenkins | 370/94 U |
| 3,878,512 | 4/1975 | Kobayashi et al. | 370/85 |
| 4,398,289 | 8/1983 | Schoute | 370/93 |
| 4,466,096 | 8/1984 | Heins et al. | 370/85 |

FOREIGN PATENT DOCUMENTS 2258623  7/1973  Fed. Rep. of Germany ... 370/94 U

Primary Examiner—Douglas W. Olms
Assistant Examiner—Frank M. Scutch, III

[57] ABSTRACT

In a two-way cable television (CATV) contention system peak upstream loading is accommodated by varying the length of the upstream transmission window during which a subscriber may randomly transmit for improved subscriber access to the CATV headend. Following an upstream transmission, the subscriber waits a predetermined period for a message receipt acknowledgment from the headend. Failure to receive this acknowledgment results in an upstream retransmission by the subscriber at a randomly selected time within a transmission window, the length of which is a function of the upstream message traffic load. The transmission window is initially short to permit rapid retransmissions upstream in order to avoid interfering noise bursts of short duration. The upstream transmission window is then increased in length to a maximum value to string out upstream transmissions during a peak access period for reducing upstream message collisions. Following upstream transmissions during the maximum transmission window, the window is then reduced in length to accommodate reduced upstream traffic following successful upstream communication by the majority of subscribers. This upstream transmission distribution arrangement improves subscriber headend access, namely system throughput, by increasing the transmission window during periods of peak access and shortening the window length following peak access periods in order to reduce the time required for a successful upstream transmission.

16 Claims, 5 Drawing Figures

PEAK LOAD ACCESS IN A TWO-WAY CATV CONTENTION SYSTEM

BACKGROUND OF THE INVENTION

This invention relates generally to two-way CATV communication systems and is specifically directed at improving subscriber upstream communication in a two-way CATV contention system particularly during periods of peak headend accessing.

In a two-way CATV system each subscriber is able to transmit signals back to the CATV headend. These subscriber-originated signals may include program purchasing requests, opinion poll responses, or CATV converter status information. The upstream signal distribution network is in the form of a "merging tree topology" in which the signals generated by many sources, or subscribers, converge and are transmitted on a single transmission line (the cable) back to the CATV headend. Collisions between upstream messages simultaneously transmitted by more than one subscriber result in the loss of the colliding messages and an unsuccessful communication attempt by the respective subscriber terminals.

In the two-way subscriber contention system referred to above various approaches have been taken for the purpose of increasing the rate of successful upstream message transmissions. One approach, generally termed "Aloha", involves the random transmission by those subscribers desiring shared media access. Simultaneous transmission of more than one subscriber results in the collision and mutilation of data packets and unsuccessful upstream communication. An unsuccessful transmission is typically followed by another random transmission by the unsuccessful subscriber who again awaits receipt of a response such as an acknowledgment from the headend indicating successful upstream message transmission. In order to further increase the rate of successful transmissions, the basic "Aloha" arrangement has been modified to form a so-called "slotted Aloha" arrangement wherein the headend transmits a synchronizing signal indicating the beginning of a frame which is divided into a sequence of time slots of mutually equal length. Each subscriber transmits a data packet to the headend within a given time slot which is randomly selected from the sequence of time slots. This approach is generally credited with reducing the number of data packet collisions to one half that encountered in the basic "Aloha" system. An example of the "slotted Aloha" approach can be found in U.S. Pat. No. 4,398,289 to Schoute.

Because of the unique environment of a two-way CATV communication system, systems utilizing either the "Aloha" or "slotted Aloha" approaches have suffered from performance limitations. For example, headend access in such systems is typically desired by most subscribers during relatively short peak periods in which a large number of subscribers transmit program requests shortly before the start of the desired program. At other times, relatively few upstream transmissions are made even in systems having large numbers of subscribers. Thus, refinements to the "Aloha" approaches have been made in order to accommodate this unique environment.

One approach to improving upstream data transmission in a two-way CATV contention system involves data packet collision detection. In this approach, each subscriber terminal is provided with a means for detecting data packet collisions in ascertaining upstream message traffic volume and for regulating subscriber terminal transmissions as a function of the detected message traffic volume. The Ethernet system is an example of this approach. Other systems make use of a so-called binary back-off algorithm for controlling the length of the window during which upstream data packet transmissions are made. For example, the length of the window for each subsequent upstream retransmission may be doubled until a predetermined window length is reached, at which time the subscriber terminal may either stop transmitting or begin the transmission cycle again starting with the shortest transmission window. This approach is graphically represented in FIG. 1 where transmission window size is shown in terms of the number of attempts or upstream data packet transmissions. This approach, which derives its name because the window size increases with the square of the number of attempts, is of limited efficiency in a two-way CATV contention system. For example, as the number of attempts approaches the predetermined cut-off point, each subscriber transmits within an increasing window even though the number of subscribers transmitting has decreased due to the successful transmissions of other subscribers who no longer contribute to the upstream data traffic load. Therefore, this approach does not address the unique environment of the typical two-way CATV subscriber contention system.

The present invention is therefore intended to overcome these and other limitations of the prior art by providing improved peak load headend access in a multi-subscriber CATV communication system wherein the subscriber upstream transmission rate is determined by the rate at which headend access is sought by the various subscribers.

OBJECTS OF THE INVENTION

Accordingly, it is an object of the present invention to provide improved headend access for subscribers in a two-way CATV contention system.

It is another object of the present invention to provide improved peak load headend access in a two-way CATV contention system.

Yet another object of the present invention is to reduce the time required for upstream communication in a two-way multiple subscriber CATV communication system by regulating subscriber upstream transmissions as a function of upstream message traffic density.

A further object of the present invention is to minimize the effects of message packet collisions and impulse noise upon upstream message traffic in a two-way CATV subscriber communication system.

An additional object of the present invention is to increase upstream data channel throughput in a two-way CATV communication system by substantially reducing the possibility of upstream message collisions from the various subscribers.

BRIEF DESCRIPTION OF THE DRAWINGS

The appended claims set forth those novel features believed characteristic of the invention. However, the invention itself, as well as further objects and advantages thereof, will best be understood by reference to the following detailed description of a preferred embodiment taken in conjunction with the accompanying drawings, in which:

DESCRIPTION OF THE PREFERRED EMBODIMENT

In the following description, various well-known circuits and components are shown in block diagram form in order not to obscure the described inventive concepts in unnecessary detail. However, it will be apparent to those skilled in the art that the described inventive concepts may be employed without use of these specific details. This is particularly true with respect to the description of the microcomputer used in carrying out the present invention where many well-known components thereof are not discussed below as they are utilized in a conventional manner in carrying out the present invention. In other instances, very specific details are provided such as with respect to the operating program of the microcomputer, particular components of the microcomputer utilized in carrying out this program, and the results of the steps carried out by the microcomputer in providing for improved subscriber access during peak loading in a two-way CATV subscriber communication system.

Figure 2:
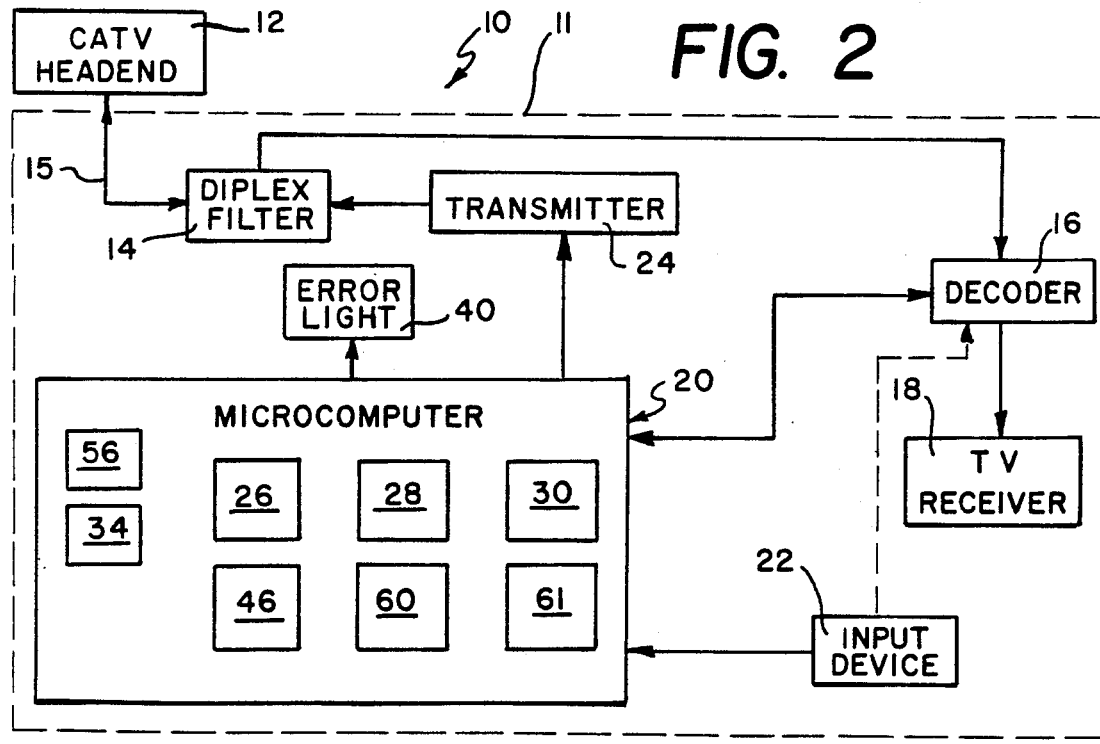
FIG. 2 is a simplified block diagram of a peak load access system for carrying out the principles of the present invention in a two-way CATV subscriber contention system.

Referring to FIG. 2, there is shown in simplified block diagram form a peak load access system 10 in accordance with the present invention. The system includes a cable headend 12 coupled to a subscriber terminal 11 via a cable 15. In a typical system, the cable headend 12 is coupled to a plurality of such subscriber terminals via cable 15. Downstream signals from the cable headend 12 to subscriber terminal 11 may include such information as subscriber address, program authorization, and program identification data which is transmitted at a selected channel frequency.

Connected to the cable 15 in each subscriber terminal 11 is a diplex filter 14 which provides the video signal as well as the coded program and address information to a decoder 16. Decoder 16 compares the transmitted program identification data with a stored subscriber program authorization code. If a match occurs, the video signal is decoded and then provided to the subscriber's television receiver 18 for viewing thereon. If a match does not occur, the video signal is not decoded and is thereby provided to the subscriber's television receiver in scrambled form. The subscriber's stored program authorization code may be updated or changed from time to time by the downstream transmission of appropriate subscriber address and program authorization data. Decoder 16 typically includes a tuner (not shown) which must be tuned to a CATV encoded channel before the decoder 16 can receive subscriber data and the transmitted video signals.

A microcomputer 20 is provided within each subscriber terminal 11 for controlling the operation thereof. For example, control signals received by the subscriber terminal 11 and detected by decoder 16 are provided to microcomputer 20 for generating upstream signals in order to provide the CATV headend 12 with subscriber terminal status information. This information provided in the form of upstream signals from subscriber terminal 11 to the CATV headend may include subscriber current channel viewing information, subscriber terminal upstream signal power level, or subscriber polling information. Subscriber polling information as well as program authorization requests may be initiated by a subscriber using a conventional input device 22 such as a keyboard for providing keystroke serial data to microcomputer 20 for processing therein. In response to these subscriber-initiated requests and polling information inputs, microcomputer 20 prepares and provides an upstream data message to the CATV headend 12 via a transmitter 24 and the diplex filter 14. In another embodiment, the input device 22 may be coupled directly to decoder 16 for providing subscriber-initiated inputs thereto as shown in dotted line form in FIG. 2. Decoder 16 then generates appropriate outputs for microcomputer 20 in generating the upstream data signals for transmission to the CATV headend.

Figure 1:
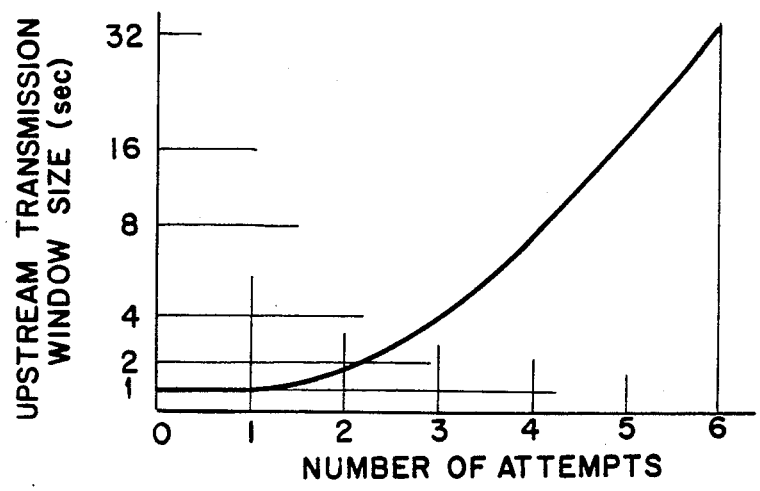
FIG. 1 illustrates the variation of upstream transmission window size as a function of the number of upstream signal transmissions in a prior art two-way CATV subscriber contention system.

As will be explained in further detail hereinafter, the transmission system of the present invention is particularly adapted for use in a contention communications system of the type having periods of peak load access such as a two-way CATV system. In such systems, headend access is typically desired by most subscribers during relatively short peak periods in which a large number of subscribers transmit upstream program authorization requests shortly before the start of a desired program. Since a large number of subscribers will therefore be contending for headend access at the same time, the likelihood of upstream data message collisions is relatively high. The previously described binary back-off algorithm is operable in such an environment by repeatedly retransmitting the desired message until it is successfully received by the headend, each transmission being effected at a random time within a window whose length is increased (in particular-doubled) in response to each successive transmission (see FIG. 1). This approach suffers from the disadvantage that, after the majority of subscribers have successfully completed their data transmissions, the remaining subscribers are forced to use unduly large transmission windows thereby reducing the speed of the system. According to the present invention, this disadvantage is overcome by initially increasing the transmission window size until a maximum window length is achieved and then decreasing the window size in response to a selected number of further transmission attempts. In this manner, the transmission window is decreased in size following the peak load period to enhance the overall speed of the system.

Figure 3:
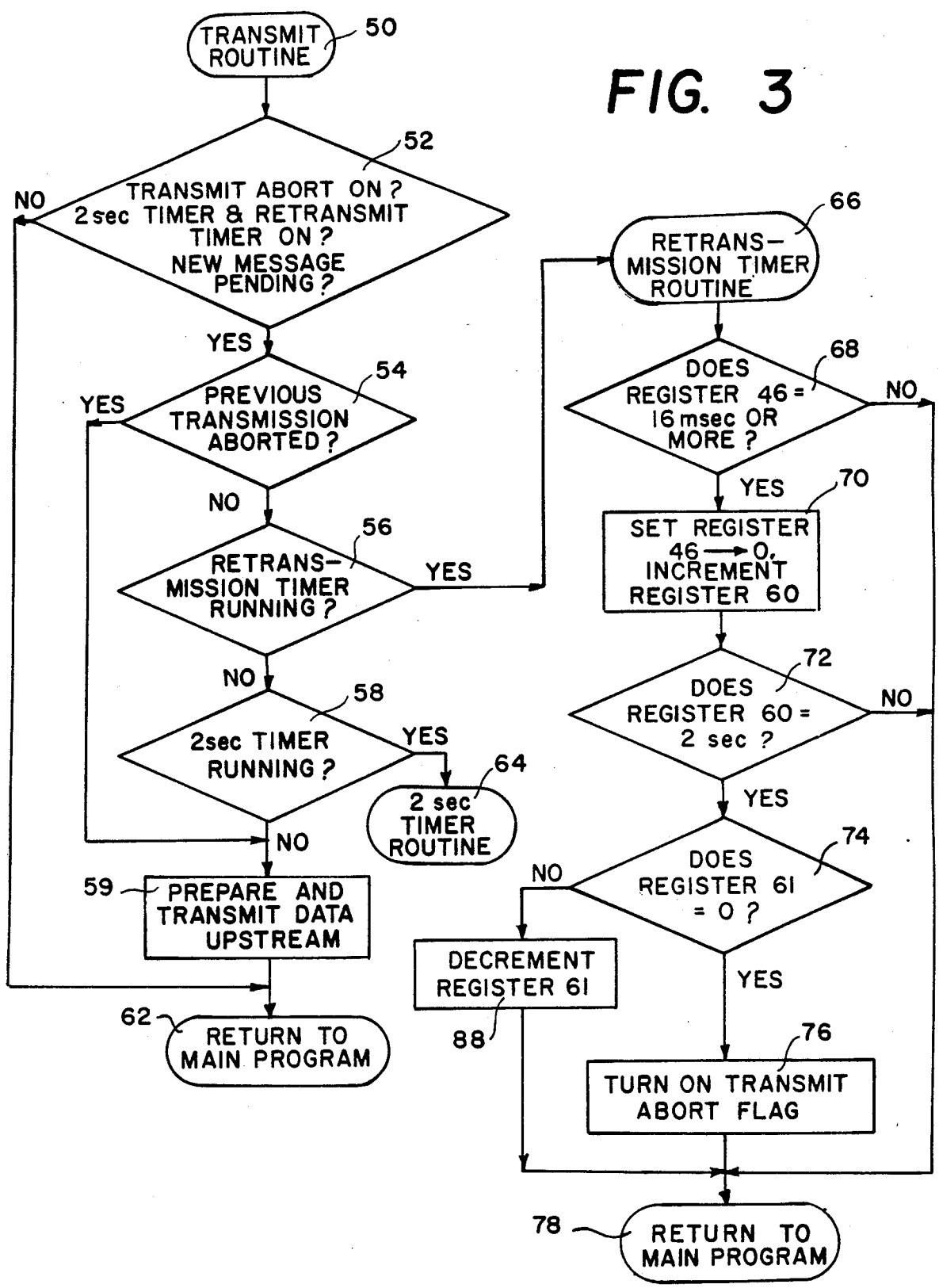
FIGS. 3 and 4 are simplified flow charts illustrating the sequence of operations executed by a microcomputer in the peak load access system of FIG. 2 in accordance with the present invention.
Figure 4:
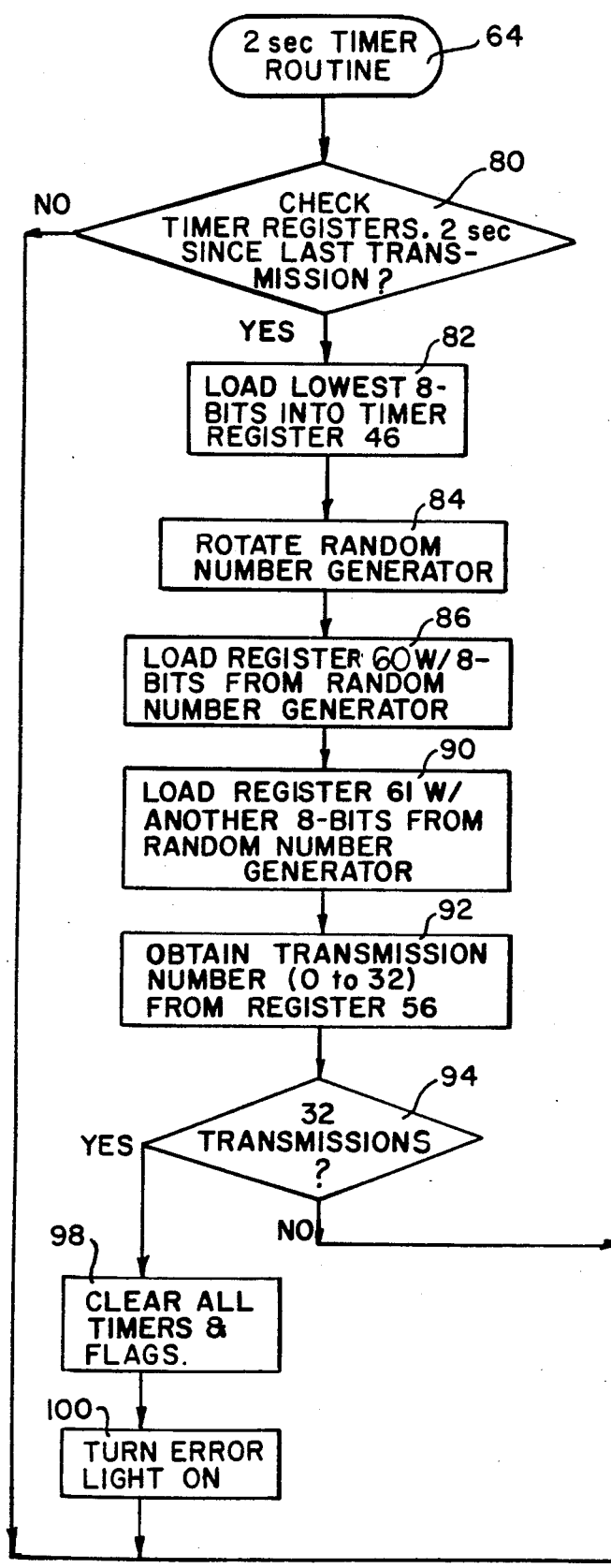
Figure 4:
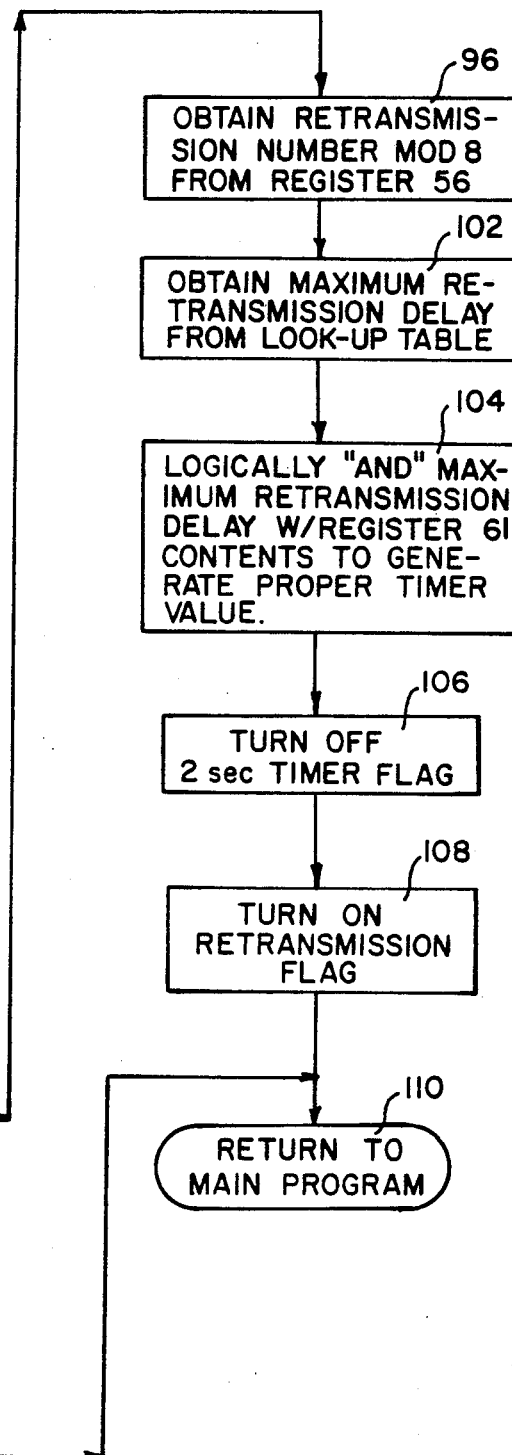

Referring to FIGS. 3 and 4, there are shown simplified flow charts of the sequence of operations carried out by microcomputer 20 in providing improved headend peak load access for a subscriber terminal in a multi-user communication system in accordance with the present invention. In referring to FIGS. 3 and 4, an oval symbol indicates the start of an operational sequence, a rectangle indicates an instruction or set of instructions resulting in the performance of a control function, and a diamond indicates a decision point based upon the comparison of binary signal inputs.

At step 50, the program stored in the microcomputer's ROM 26 exits the main operating, or executive, program and initiates the start of an upstream message transmission in accordance with the present invention. At step 52, the program next determines if the transmit abort flag is on indicating that the previous upstream transmission was not completed. This could occur for any number of reasons such as, for example, if the keystroke serial data provided from the input device 22 to microcomputer 20 was updated. If the transmit abort flag is off, the program returns to the main operating program at step 62. If the transmit abort flag is not off, the program then determines if the 2 second timer 60 and the retransmit timer in the microcomputer are on and if a new message is pending. If these timers are on or if a new message is pending, the program proceeds to step 54. If not, the program returns to the main operating program at step 62. The 2 second timer 62 provides for a 2 second delay following an upstream transmission during which the subscriber terminal awaits an upstream message receipt acknowledgment from the headend. If an acknowledgment is not received during this period, the subscriber retransmits the upstream message as described below. The retransmit timer, which is also in the microcomputer 20 and described below, then determines the time of the next upstream transmission.

At step 54, the program determines whether the previous transmission was aborted, and if so, proceeds to step 59 for preparing and transmitting the previously aborted upstream data message to the CATV headend. If the previous transmission was not aborted as determined at step 54, the program checks to see if the retransmission timer is running and if running, proceeds to the retransmission timer routine at step 66. If the retransmission timer is not running, the program proceeds to step 58 and determines if the 2 second timer 60 is running. If the 2 second timer is running, the program proceeds to a 2 second timer routine at step 64 shown in detail in FIG. 4 and described below. If the 2 second timer is not running, the program proceeds to step 59 for preparing and transmitting a new upstream data message to the CATV headend and for returning to the main operating program at step 62.

Referring back to step 56, if it is determined that the retransmission timer is still running, the program branches to a retransmission timer routine at step 66 in order to permit the retransmission timer to run out whereupon the transmit abort flag is turned on to permit an upstream data transmission to occur. The retransmission timer includes a 16 millisecond register, or timer, 46, a 2 second register 60, and a multi-2 second register 61. In the retransmission timer routine, the program initially determines if the 16 millisecond register has counted up to 16 milliseconds. If it has not, the program returns to the main program at step 78. If register 46 has counted to 16 milliseconds, the program then sets the 16 millisecond register 46 to zero and increments the 2 second register. The program at step 72 then determines whether register 60 has counted to 2 seconds and if not, branches and returns to the main program at step 78. If the 2 second register 60 has counted 2 seconds, the program then sets the 2 second register 60 to zero at step 72. The program then determines if the multi-2 second register 61 is set to 0, and if not set to 0, the the program decrements this register at step 88 and returns to the main program. If the multi-2 second register 61 is set at zero, the program turns on the transmit abort flag at step 76 to permit an upstream data transmission to occur the next time the transmit routine is executed. The transmission timer routine then returns to the main program at step 78.

If at step 56, the program determines that the retransmission timer is not running, the program branches to step 58 where it determines if the 2 second timer 60 is running. If the 2 second timer is running, the program branches to step 64 for execution of a 2 second timer routine shown in flow chart form in FIG. 4.

The 2 second timer routine is entered at step 64 and followed by, at step 80, a check of the various timer registers for insuring that they are properly initialized and have fully counted out. A check is then made to determine if it has been 2 seconds since the last upstream transmission. If it has not been 2 seconds since the last upstream transmission by the subscriber terminal, the program branches and returns to the main program at step 110. If it has been at least 2 seconds since the last upstream transmission, the program proceeds at step 82 to load the lowest 8 bits into the 16 millisecond timer register 46. It is in this manner that the 16 millisecond timer register 46 is loaded with a random number from a random number generator 30 in microcomputer 20. The contents of the random number generator 30 are then rotated with 8 bits from the random number generator loaded into the 2 second register 60 at step 86. Another 8 bits from the random number generator 30 are then loaded into the multi-2 second register 61 at step 90. It is in this manner that the three timing registers used for generating the random transmission time are programmed.

At step 92, the program determines from a register 56 in microcomputer 20 the number of upstream message retransmissions. The program then determines if the maximum number of retransmissions, i.e., 32 transmissions, has occurred at step 94. If 32 transmissions have occurred, the program then proceeds to step 98 for clearing all timers and flags and turns on the error light 40 at step 100. The 2 second timer routine then executes a return to the main program at step 110.

If at step 94 it is determined that 32 transmissions have not yet been made, the program branches to step 96 for obtaining the retransmission number from register 56. The program then at step 102 refers to a look-up table in ROM 26 in order to determine the maximum retransmission delay from values stored therein. At step 104, the maximum transmission delay is logically "ANDed" with the contents of the multi-2 second register 61 in generating the proper timer value. Once the proper timer value has been established the program then turns off the 2 second timer flag at step 106 to insure that the next time the transmit routine is executed the system does not wait 2 seconds before transmitting upstream. At step 108 the retransmission flag is turned on which similarly insures that the next time the 2 second timer routine is executed an upstream data message is transmitted from the subscriber terminal to the CATV headend.

The computer listing for controlling the upstream message transmissions of a subscriber terminal for improved peak load access to the CATV headend is shown in Table I. Contained in this program assembly listing is such information as memory addresses, object code, statement number and additional source statement information. This program listing is directed to the 8048 microcomputer which is used in a preferred embodiment of the present invention.

Figure 5:
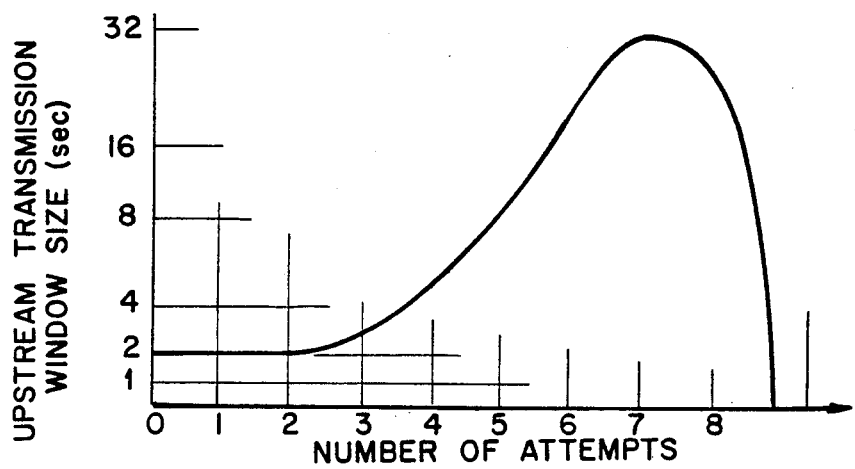
FIG. 5 illustrates the variation of upstream transmission window size with the number of upstream signal transmissions in a two-way CATV subscriber communication system in accordance with the present invention.

In a preferred embodiment, as shown in FIG. 5, upstream transmissions are made randomly in transmission windows of varying length after waiting 2 seconds for receipt of an acknowledge signal from the CATV headend. If an acknowledge signal is not received during this 2 second waiting period, the subscriber terminal transmits randomly within a 2 second window. The system again waits for 2 seconds for receipt of an acknowledge signal. If not received, the subscriber terminal again transmits randomly in a 2 second window and again waits for an acknowledge. This cycle continues with the transmission window sequentially increasing to 4, 6, 14, 20 and 32 seconds and then decreasing to 26 seconds. If an acknowledge signal is not yet received, the subscriber discontinues its upstream transmissions and the error lite 40 is illuminated. In another embodiment, the aforementioned cycle of sequentially increasing and decreasing the upstream transmission window is repeated four times or until an acknowledge signal is received. If an acknowledge signal is still not detected, the subscriber terminal stops transmitting upstream and the error lite 40 is illuminated.

There has thus been shown a system and method for improving peak load access to the headend in a two-way CATV subscriber contention system. The upstream transmission window for each subscriber terminal is varied as a function of the upstream message traffic density, with the window initially short in length to permit several upstream transmissions when upstream traffic is relatively light. The window is then lengthened as upstream traffic increases to string out subscriber transmissions over a longer period in order to reduce the possibility of information loss due to message collisions. Following this period of high message traffic density, the upstream transmission window is then reduced in length to permit those subscribers as yet unsuccessful to transmit upstream to the CATV headend.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. In a two-way contention communications system wherein a data message is successively transmitted from a subscriber terminal to a central facility until the data message is successfully received by the central facility, each data message transmission occurring at a random time within a respective time interval, the improvement comprising the steps of:
    increasing the length of said time interval in response to each successive transmission of said data message until a time interval of a predetermined maximum length is achieved corresponding to a predetermined number of successive transmissions of said data message; and
    decreasing the length of said time interval in response to each of a selected number of succesive transmission of said data message following said predetermined number of successive transmissions.

2. The method of claim 1 including the steps of:
    generating an acknowledge signal at said central facility in response to the successful receipt of a transmitted data message from said subscriber terminal;
    transmitting the acknowledge signal from said central facility to said subscriber terminal; and
    terminating said successive transmissions of said data message following the receipt by said subscriber terminal of said acknowledge signal.

3. The method of claim 1 including the steps of successively repeating said increasing and decreasing steps in sequence a predetermined number of times.

4. The method of claim 1 wherein said communications system comprises a two-way CATV contention communications system and wherein said maximum time interval length comprises about thirty two second, said predetermined number of successive transmissions comprises seven and said selected number of successive transmissions following said predetermined number of transmissions comprises one.

5. The method of claim 1 wherein the time intervals within which a given number of the initial successive transmissions of said data message are effected are of substantially equal length.

6. The method of claim 2 comprising the further step of providing a visual indication if an acknowledge signal is not received by the subscriber terminal.

7. A method for transmitting data from a plurality of subscriber terminals to a headend in a two-way CATV contention communication system, comprising:
    providing a transmission instruction at a subscriber terminal;
    successively transmitting a single data message in response to said transmission instruction from the subscriber terminal to the headend, each data message transmission occurring at a random time within a respective time interval which initially increases in length in response to each successive transmission of said data message until a time interval of a predetermined maximum length is achieved corresponding to a predetermined number of successive data message transmissions whereupon the length of the time interval decreases in response to each of a selected number of successive transmissions of said data message following said predetermined number of successive transmissions;
    generating an acknowledge signal at the central facility in response to the successful receipt of a transmitted data message from the subscriber terminal;
    transmitting the acknowledge signal from the central facility to the subscriber terminal; and
    withdrawing said transmission instruction following the receipt by said subscriber terminal of said acknowledge signal for terminating said repeated transmissions.

8. The method of claim 7 wherein said data message transmitting step comprises successively repeating said increasing and decreasing steps in sequence a predetermined number of times.

9. In a two-way contention communcations system wherein a data message is successively transmitted from a subscriber terminal to a central facility until the data message is successfully received by the central facility, each data message transmission occurring at a random time within a respective time interval, the improvement comprising:

means for increasing the length of said time interval in response to each successive transmission of said data message until a time interval of a predetermined maximum length is achieved corresponding to a predetermined number of successive transmissions of said data message and for decreasing the length of said time interval in response to each of a selected number of successive transmissions of said data message following said predetermined number of successive transmissions.

10. A communications system according to claim 9 including:
means for generating an acknowledge signal at said central facility in response to the successful receipt of a transmitted data message from said subscriber terminal;
means for transmitting the acknowledge signal from said central facility to said subscriber terminal; and
means for terminating said successive transmissions of said data message following the receipt by said subscriber terminal of said acknowledge signal.

11. A communications system according to claim 9 wherein said means for increasing and decreasing comprises means for successively repeating said increasing and decreasing operations in sequence a predetermined number of times.

12. A communications system according to claim 9 wherein said system comprises a two-way CATV contention communcations system and wherein said maximum time interval length comprises about thirty two seconds, said predetermined number of successive transmissions comprises seven and said selected number of successive transmissions following said predetermined number of transmissions comprises one.

13. A communications system according to claim 9 wherein the time intervals within which a given number of the initial successive transmissions of said data message are effected are of substantially equal length.

14. A communications system according to claim 10 including means for providing a visual indication if an acknowledge signal is not received by the subscriber terminal.

15. A two-way CATV contention communication system for transmitting data from a plurality of subscriber terminals to a headend, comprising:
means for providing a transmission instruction at a subscriber terminal;
means for successively transmitting a single data message in response to said transmission instruction from the subscriber terminal to the headend, each data message transmission occurring at a random time within a respective time interval which initially increases in length in response to each successive transmission of said data message until a time interval of a predetermined maximum length is achieved corresponding to a predetermined number of successive data message transmissions whereupon the length of the time interval decreases in response to each of a selected number of successive transmissions of said data message following said predetermined number of successive transmissions;
means for generating an acknowledge signal at the central facility in response to the successful receipt of a transmitted data message from the subscriber terminal;
means for transmitting the acknowledge signal from the central facility to the subscriber terminal; and
means for withdrawing said transmission instruction following the receipt by said subscriber terminal of said acknowledge signal for terminating said successive transmissions.

16. A communications system according to claim 15 wherein said means for successively transmitting comprises means for successively repeating said increasing and decreasing operations in sequence a predetermined number of times.

* * * * *